United States Patent [19]
Prinz

[11] 3,937,415
[45] Feb. 10, 1976

[54] DOWNRIGGER

[76] Inventor: John Prinz, 1303 W. Carmen, Chicago, Ill. 60640

[22] Filed: May 16, 1973

[21] Appl. No.: 360,818

[52] U.S. Cl............. 242/106; 43/27.4; 242/84.5 R; 242/84.5 A; 242/99
[51] Int. Cl.² ....................................... A01K 89/00
[58] Field of Search ............ 242/86.5 R, 86.4, 86.7, 242/96, 99, 106, 107.3, 156, 129.8, 84.5 R, 84.51 R, 84.51 A, 84.52 R, 84.52 A, 75.4, 75.47, 156.2; 43/24, 27.4, 43.12

[56] References Cited
UNITED STATES PATENTS

| | | | |
|---|---|---|---|
| 364,509 | 6/1887 | Gundorph .................. | 242/84.51 R |
| 374,737 | 12/1887 | Geils ............................ | 242/106 |
| 2,189,952 | 2/1940 | Guy .............................. | 242/84.5 R |
| 2,548,247 | 4/1951 | West ............................. | 242/99 |
| 2,583,491 | 1/1952 | Orlando ...................... | 242/99 X |
| 3,072,356 | 1/1963 | Leuthner ..................... | 242/84.5 R |
| 3,581,427 | 6/1971 | Reinertson ................. | 43/24 |
| 3,614,016 | 10/1971 | Rieth ........................... | 242/106 |
| 3,630,166 | 12/1971 | Riddle ......................... | 242/84.51 R |
| 3,719,331 | 3/1973 | Harsch ........................ | 242/86.5 R X |
| 3,785,079 | 1/1974 | Rohn ........................... | 242/106 X |

*Primary Examiner*—Stanley N. Gilreath
*Assistant Examiner*—John M. Jillions
*Attorney, Agent, or Firm*—Burns, Doane, Swecker & Mathis

[57] ABSTRACT

A downrigger that has a swivelled head to be mounted anywhere on the boat for use in trolling. The line extends over a reel mounted on a pedestal, which reel is provided with a locking device for holding it in a desired position and yet is released automatically in the event of a snag in the line. An automatic drag is applied to the rim of the reel with provisions for adjustment to enable the operator to adjust the speed at which he desires to let the sinkers go down to the desired depth by tightening or loosening the tension on the spring adjustment. A line guard is mounted on the pedestal in position to prevent the line from unwinding off the reel.

7 Claims, 7 Drawing Figures

DOWNRIGGER

SUMMARY OF THE INVENTION

This invention relates to improvements in downriggers of the type used for trolling.

Most downriggers provided heretofore are bolted to the base plates in secure positions on a boat. In some instances, different models are provided, one for mounting on the rear and another for location on the side of the boat. The line is customarily wound on a reel, but no satisfactory provision has been made for locking the reel while allowing it to be released in event of snagging of the line and thus have caused the line to break and sometimes become lost.

Where a drag has been provided heretofore it is usually of a pressure type design which has to be released when the sinker is being raised so that the operator does not have to work against the weight of the sinker plus the drag and then readjust it each time the sinker is being lowered into the water. Other objectionable features have been found in prior downriggers as used heretofore.

One object of this invention is to obviate these objections and to improve the construction of the downrigger trolling equipment.

Another object of the invention is to provide for the swivelling of the base of the reel or pedestal supporting the same so as to enable this to be mounted in any desired position on the boat.

Another object of the invention is to improve the locking of the reel in a set position during trolling so as to hold the sinker securely at the desired depth and yet to provide for its release automatically in case of a snag in the line.

A further object of the invention is to improve the drag which applies pressure to the reel and to release automatically when the reel is reversed.

These objects may be accomplished, according to one embodiment of the invention, by providing a base for mounting on the boat with means for a swiveled connection between the base and the mounting pedestal for the reel so as to enable the reel to be turned in any desired direction with respect to the base, thus providing for location either on the rear of the boat or on a side. The extension rod which guides the line is mounted in the base portion of the pedestal and there is provision for locking adjustment between the pedestal and the base of the downrigger so as to hold it securely in the desired position.

The reel may be locked in a secure position against turning when it is desired to hold the sinker securely at a desired depth and yet may be released automatically in case of a snag of the line. This release will also cause a clicking action to alert the operator.

An automatic drag controls the rotation of the reel to enable the operator to adjust the speed at which he desires to let the sinker go down to the desired depth by tightening or loosening the tension on the spring adjustment provided. This drag is so positioned as to be released automatically in the event of reversal of rotation of the reel.

A line guard is also provided to prevent the line from unwinding off the reel.

BRIEF DESCRIPTION OF THE DRAWINGS

This embodiment of the invention is illustrated in the accompanying drawings, in which.

DETAILED DESCRIPTION OF DISCLOSURE

Figure 1:
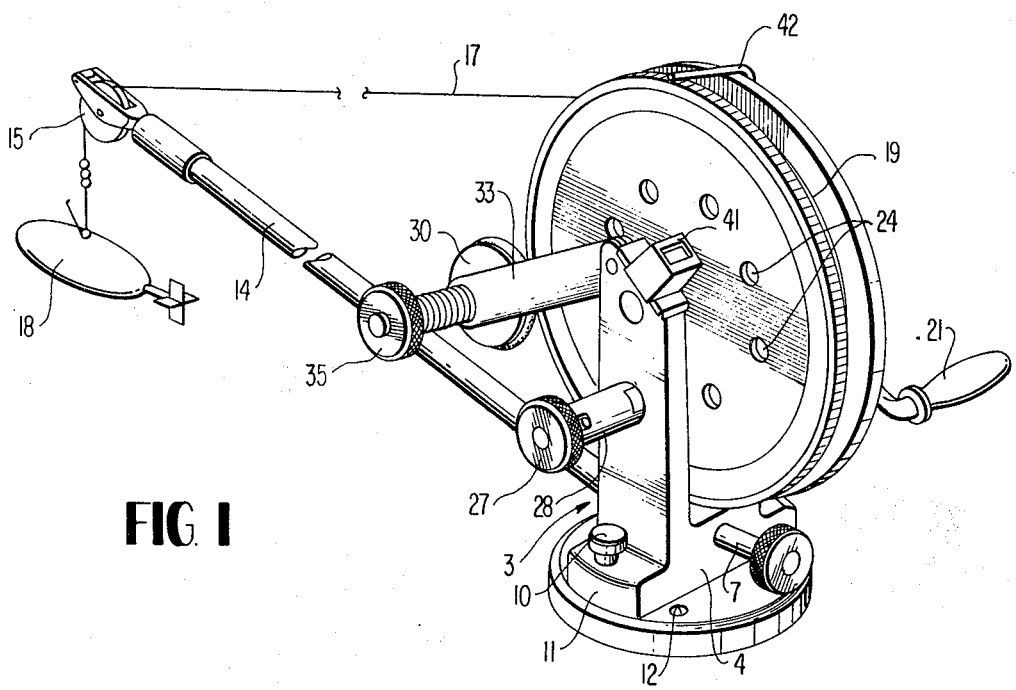
FIG. 1 is a perspective view of the downrigger in operative position.

The downrigger comprises a base 1 capable of being secured effectively to a desired part of a boat. This base may be mounted either on the rear or a side of the boat and used alternately in different positions. The base 1 has an upstanding pin 2 mounted thereon and may be cast as a part of the cast metal base, as illustrated particularly in FIGS. 4, 6 and 7.

Seated upon the base 1 is a pedestal, generally indicated at 3. The pedestal 3 comprises a support portion 4 and upstanding sides 5 forming supporting brackets. The support 4 has a central opening 6 therein receiving the pin 2 and forming a swiveled connection for the pedestal 3 on the base 1 so as to allow the pedestal to be rotated around the upright central axis of the pin 2. The pedestal may be locked in a secure position with respect to the base 1 by a locking screw 7, shown in FIGS. 6 and 7, which is threaded through a side of the support 4, with a pointed end 8 in position to engage selectively in one of a series of circumferentially spaced recesses 9 formed in the adjacent portion of the pin 2.

By loosening the pin 7, the pedestal 3 can be swiveled around the axis of the pin 2 and then the pin retightened by engaging the pointed end 8 thereof in one of the recesses 9, thus holding the pedestal securely against turning movement during operation of the downrigger.

The support 4 may be provided also, if desired, with locking pins 10 slidably inserted through ears 11 on opposite sides of the pedestal 3. The pins 10 are in positions to enter openings 12 spaced apart in an arc on each lateral side of the base 1. The pins 10 can be withdrawn from the respective openings 12 to permit the swiveling of the pedestal and then reinserted to lock the pedestal in secure adjusted position with respect to the base. These locking pins may be used alternately with the locking screw 7 or in addition thereto as found desirable.

Figure 2:
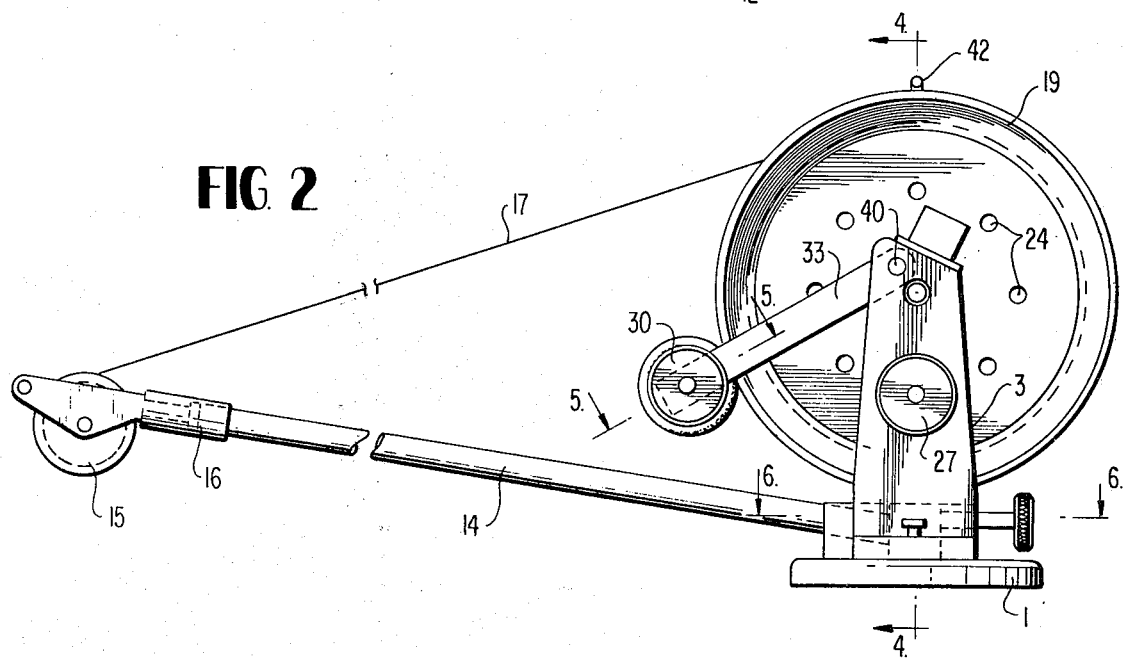
FIG. 2 is a side elevation thereof.
Figure 3:
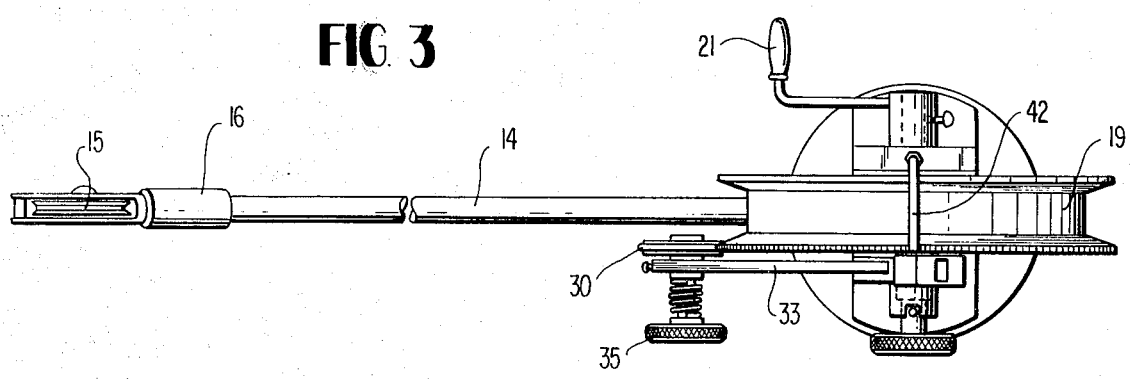
FIG. 3 is a top plan view thereof.
Figure 6:
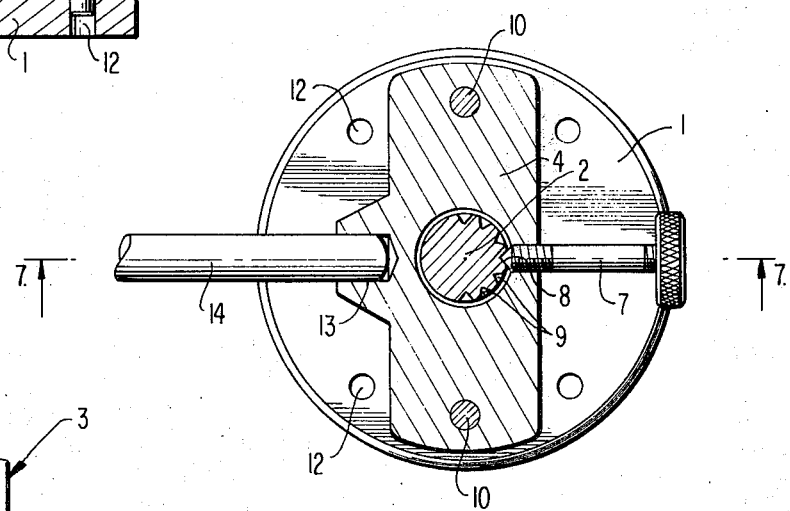
FIG. 6 is a detail cross section through the swivel mount on the line 6—6 in FIG. 2.
Figure 7:
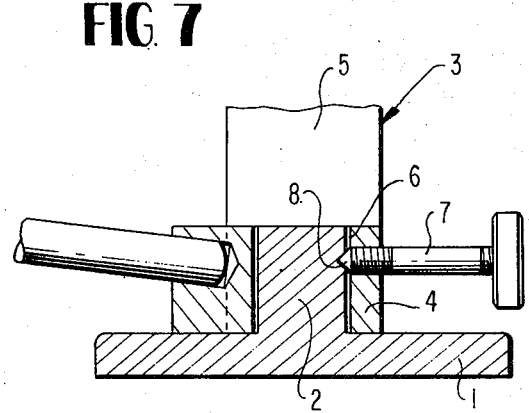
FIG. 7 is a vertical cross section through the swivel mount on the line 7—7 in FIG. 6.

The support 4 also has a recess 13 in the side thereof opposite from the locking pin 7 into which an end of an extension rod 14 is inserted and secured in any desired manner, as shown in FIGS. 6 and 7. The extension rod 14 extends outward from the base 1, as shown in FIGS. 1 and 2, and may be of a desired length. The outer end of the extension rod 14 supports a pulley 15, preferably by means of a swiveled connection 16. This tip structure is preferably of heavy duty type so as to hold the line securely, permitting the pulley 15 to swing about the axis of the extension rod 14 and to guide the line effectively, thereby preventing it from slipping off under any condition. The line extending thereover is indicated at 17 in FIGS. 1 and 2 and is adapted to support a sinker 18, indicated in FIG. 1, and appropriate hook structures as found desirable.

The line 17 extends inward to a reel 19 mounted on a shaft 20. The shaft 20 is journaled in suitable bearings in the upper ends of the brackets 5 of the pedestal 3.

A handle 21 is secured to the shaft 20 for rotation of the reel in winding up the line. The handle is detachably mounted on the end of the shaft 20, as indicated at 22, so that it can be removed for storage and to free the end of the shaft for future additional attachments such as a motor for the purpose of reeling in the sinker so that the hands are free for other purposes.

Figure 5:
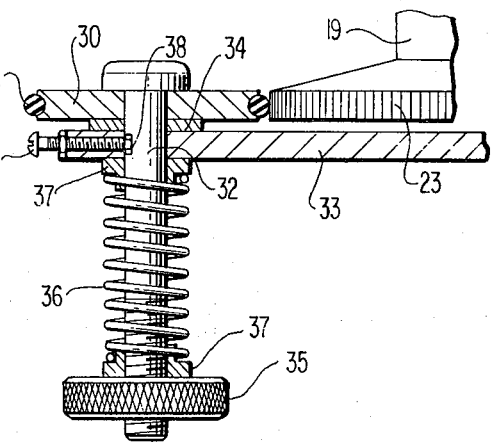
FIG. 5 is a detail cross section through the automatic drag on the line 5—5 in FIG. 2.
Figure 4:
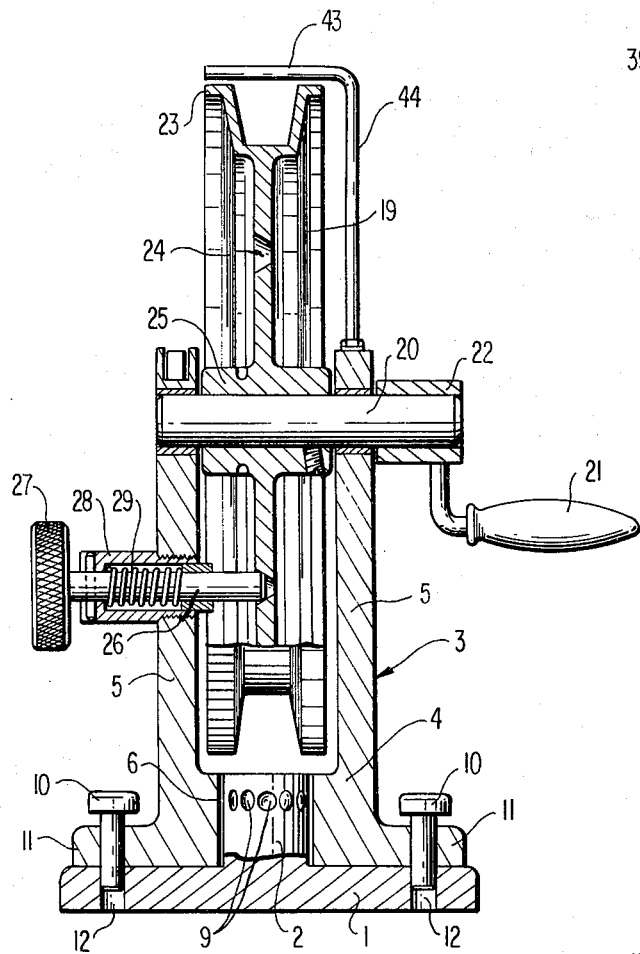
FIG. 4 is a vertical cross section through the downrigger on the line 4—4 in FIG. 2.

The reel 19 is preferably formed of cast construction with a central web, as indicated in FIG. 4, and with surrounding rims 23 thereon, at least one of which is knurled, as indicated in FIG. 5.

A suitable locking device is provided to hold the reel in a set position and to be released automatically in case of a snag in the line. This locking device preferably includes a series of openings 24 in one of the side walls of the reel 19 spaced apart about the axis of the shaft 20. Each of the openings 24 is formed of cone shape, as illustrated in FIG. 4, and receives therein a bevelled end 25 on a pin 26 which is slidably mounted in one of the upstanding brackets 5.

The pin 26 extends laterally through the bracket, with a hand knob 27 on the outer end thereof. A bushing 28 surrounds the intermediate portion of the pin 26, being secured at one end in the adjacent bracket 5. A helical spring 29 is sleeved over the pin 26, with one end thereof anchored to the outer end of the bushing 28 and the opposite end anchored to the pin 26. Thus, the spring 29 normally tends to urge the pin 26 inwardly toward the reel 19 and when its inner end 25 is engaged in one of the openings 24 will lock the reel in a set position. This locking action, however, is automatically released in the event of a snag in the line which will cause the reel to rotate, thus forcing the pin out of the opening due to the bevelled connection therebetween.

As the reel continues to rotate, the engagement successively of the inner end of the pin with the other openings 24 will cause a clicking sound to alert the operator to the danger involved with respect to the line.

An automatic drag is also provided, as shown in FIG. 5. This drag includes a wheel 30 having an O-ring 31 of rubber or rubber-like material on the periphery thereof in position for bearing relation against the knurled rim 23 of the reel. The wheel 30 is mounted on the inner end of a shaft 32 which is slidably mounted in a support arm 33 so as to move axially therethrough.

A friction surface 34 is interposed between one side of the wheel 30 and the adjacent side of the support arm 33. A disc of brake lining material may be used for the friction surface 34, being secured rigidly to the side of the arm 33 in position for friction bearing relation against a side of the wheel 30 when the shaft moves axially toward the arm. In this position, the O-ring which forms the rim of the wheel is in position to bear against the knurled surface on the rim 23 of the reel.

The shaft 32 carries on its opposite end an adjusting wheel 35 screw threaded on the end of the shaft. Interposed between the inner face of the adjusting wheel 35 and the adjacent side of the support arm 33 is an helical spring 36, thus tending to move the shaft 32 axially in a direction to move the rim of the wheel 30 to a position where it will engage the rim of the reel 19, which is the position shown in FIG. 5.

The spring 36 bears at the opposite ends on washers 37, one of which is in pressure engagement against a side of the support arm 33 and the other against a side of the wheel 35. The axial movement of the shaft 32 is controlled by a slot 38 engaged by a screw 39 which is threaded through the end portion of the support arm 33, thus allowing axial movement of the shaft 32, but preventing rotation of the shaft.

As shown in FIGS. 1 and 2, the support arm 33 extends in an oblique position from the wheel 30 to the pedestal 3. The inner end of the support arm 33 is pivotally mounted at 40 on the upper end of one of the pedestal brackets, capable of swinging motion with respect thereto so as to hold the wheel in proper position to apply the desired drag on the reel. This enables the operator to adjust the speed at which he desires to let the sinker go down to the desired depth by tightening or loosening the tension on the spring 36 by rotation of the adjusting wheel 35. This needs to be done only once for any specific weight of the sinker.

The engagement of the drag is automatic, bearing against the knurled rim on the reel as the downward motion of the rubber drag wheel engages the rim. The depending relation of the arm 33, offset in its pivotal mounting 40 from the axis of the mounting shaft 20 on which the reel is mounted, causes the drag wheel to be held at the proper angle to apply drag on the reel until the reel is reversed in direction when the drag will be automatically released.

As the reel rotates in a counterclockwise direction, the drag wheel will be raised automatically and will not apply drag pressure to the periphery of the reel. The downward motion of the reel will cause its rim to engage the drag wheel cushioned by the rubber ring on its periphery. The braking force of the drag wheel will permit the operator to slow down the reel sufficiently in order to let the weight down at any desired speed. By reversing the motion of the reel or bringing up the weight, the drag wheel is lifted and thus disengages from the reel, permitting the operator to bring up the weight without working against the braking force of the drag wheel.

A depth counter is indicated generally at 41, mounted on the upper end of one of the pedestal side brackets 5 in position and at such an angle that the operator can see the depth of the line in almost any position at which the sinker is located at the moment.

A line guard is shown at 42 extending over the reel 19 across the periphery thereof, as shown in FIGS. 1 and 2. This line guard is in the form of a small rod which is turned downward to provide a support member 44 for holding the line guard spaced from the periphery of the reel and extending across the latter. The support member 44 is mounted in the upper end of one of the brackets 5 of the pedestal, as will be apparent from FIG. 4.

The use of the downrigger will be apparent from the foregoing explanation. It has several improved and advantageous features which make it more desirable and practical for use than other downriggers that have been provided heretofore, some of which have been pointed out.

While the invention has been illustrated and described in one embodiment, it is recognized that variations and changes may be made therein without departing from the invention as set forth in the claims.

I claim:

1. An outrigger type trolling equipment, comprising a pedestal, a reel adapted for winding a line thereon, means journaling the reel on the pedestal for turning movement about an axis, said reel having a plurality of conical openings in a side thereof spaced circumferentially around the axis, and a pin slidably mounted on the pedestal having a conical end portion in position to engage selectively in the conical openings for releasably locking the reel against turning movement of its axis by surface to surface contact between the conical end portion and a conical opening, and resilient biasing means between the pedestal and the slidably mounted pin for allowing automatic disengagement of the conical pin end portion from the selected conical opening upon excess turning force being applied to the reel.

2. An outrigger type trolling equipment, comprising a pedestal, a reel adapted for winding a line thereon, means journaling the reel on the pedestal for turning movement about an axis, said reel having a rim, a drag wheel having a friction surface in position to bear upon the rim of the reel, an elongated arm supporting the drag wheel at one end thereof, and means pivotally mounting the opposite end of the arm on the pedestal for swinging movement of the arm about an axis spaced from the axis of the reel, said axis of swinging movement being operably positioned to cause the drag wheel to bear with increased pressure on the wheel when the wheel is rotated to unwind the line and to cause the drag wheel to release pressure on the wheel when the wheel is rotated to wind the line.

3. An outrigger type trolling equipment, according to claim 2, including a friction surface beside the drag wheel in position to be engaged thereby, and means for yieldably urging the drag wheel against the friction surface.

4. An outrigger type trolling equipment according to claim 3, including means for adjusting the tension of the yieldable means.

5. An outrigger type trolling equipment, according to claim 2, including a shaft mounted in the arm and supporting the drag wheel on one end thereof, a brake surface interposed between the arm and the drag wheel in position for engagement by the latter, and a spring bearing at one end against the arm and at the opposite end against the shaft tending to move the drag wheel against the brake surface.

6. An outrigger type trolling equipment according to claim 2, including a line guard extending over the reel, and means mounting the line guard on the pedestal beside the reel.

7. An outrigger type trolling equipment comprising a flat plate-like base having an upstanding pin thereon, a pedestal including a support having a pair of upstanding brackets on the support, a reel journaled on the upstanding brackets for rotation about an axis and for winding of a line thereon, a central bottom opening in the support surrounding the pin and journaling the support on the pin for swivelling movement of the reel and line with respect to the base, a drag wheel having a friction surface in position to bear upon the rim of the reel, an elongated arm supporting the drag wheel at one end thereof for turning movement about an axis, and means pivotally mounting the opposite end of the arm on one of the upstanding brackets for swinging movement of the arm about an axis spaced from the axis of the reel, said axis of swinging movement being operably positioned to cause the drag wheel to bear with increased pressure on the wheel when the wheel is rotated to unwind the line and to cause the drag wheel to release pressure on the wheel when the wheel is rotated to wind the line.

* * * * *